(12) United States Patent
Lang et al.

(10) Patent No.: US 10,007,084 B2
(45) Date of Patent: Jun. 26, 2018

(54) VISUALIZATION SYSTEM FOR VEHICLES

(71) Applicant: Mekra Lang GmbH & Co. KG, Ergersheim (DE)

(72) Inventors: Werner Lang, Ergersheim (DE); Georg Hecht, Weihenzell (DE); Albrecht Popp, Weihenzell (DE)

(73) Assignee: Mekra Lang GmbH & Co. KG, Ergersheim (DE)

( * ) Notice: Subject to any disclaimer, the term of this patent is extended or adjusted under 35 U.S.C. 154(b) by 3 days.

(21) Appl. No.: 15/239,831

(22) Filed: Aug. 18, 2016

(65) Prior Publication Data

US 2017/0059814 A1 Mar. 2, 2017

(30) Foreign Application Priority Data

Aug. 24, 2015 (DE) .......................... 10 2015 216 145

(51) Int. Cl.
*G02B 7/182* (2006.01)
*B60R 1/06* (2006.01)
(Continued)

(52) U.S. Cl.
CPC ................ *G02B 7/182* (2013.01); *B60R 1/00* (2013.01); *B60R 1/06* (2013.01); *F16B 21/065* (2013.01)

(58) Field of Classification Search
CPC .. G02B 7/182; B60R 1/00; B60R 1/06; F16B 21/065
See application file for complete search history.

(56) References Cited

U.S. PATENT DOCUMENTS

| 5,662,375 A | 9/1997 | Adams et al. ................. 296/214 |
| 2011/0096427 A1* | 4/2011 | Uken ...................... G02B 7/182 |
| | | 359/872 |

FOREIGN PATENT DOCUMENTS

| DE | 9310678 U1 | 7/1993 |
| DE | 4416348 A1 | 5/1994 |

(Continued)

OTHER PUBLICATIONS

Extended European Search Report dated Jan. 23, 2017, from the European Patent Office in the related foreign application EP16185399.9 citing the references A-E above (7 pages).

(Continued)

*Primary Examiner* — Jennifer D. Carruth
(74) *Attorney, Agent, or Firm* — Imperium Patent Works; Darien K. Wallace

(57) ABSTRACT

A visualization system for vehicles includes a mirror glass, three housing elements and a securing element. The first element includes an engagement aperture. The second element includes a first shaft extending in an outward direction. The first shaft has a first undercut opposite a rear side. The third element includes a second shaft that extends in an inward direction towards the housing. The second shaft has a second undercut opposite a rear side. The securing element extends in the inward direction into the engagement aperture and presses against both rear sides of the shafts causing both the first and second undercuts to press against the edge of the engagement aperture from opposite sides and thereby preventing the first and second shafts from moving either inward or outward with respect to the first element. The mirror glass is disposed on the opposite side of the third element from the first element.

20 Claims, 4 Drawing Sheets

(51) Int. Cl.
 *F16B 21/06* (2006.01)
 *B60R 1/00* (2006.01)

(56) References Cited

FOREIGN PATENT DOCUMENTS

| | | |
|---|---|---|
| DE | 29808871 U1 | 5/1998 |
| JP | 2007278374 A | 4/2006 |
| JP | 2014-069782 A | 10/2012 |
| WO | WO 01/92669 A1 | 6/2000 |
| WO | WO 2001/92669 A1 | 6/2000 |

OTHER PUBLICATIONS

English translation of the Jan. 23, 2017 extended European search report from the European Patent Office in EP16185399.9 listed in F above. (6 pages).

Office action dated Apr. 27, 2016, from the German Patent Office in the related foreign application DE102015216145.5 citing the reference A above, along with an English translation of the Office action (7 pages).

Office action dated Oct. 30, 2017, from the Korean Patent Office in the related foreign application KR10-2016-0105343 citing the references A-C above (8 pages).

English translation of Office action (D above) dated Oct. 30, 2017, from the Korean Patent Office in the related foreign application KR10-2016-0105343 (5 pages).

\* cited by examiner

VISUALIZATION SYSTEM FOR VEHICLES

CROSS REFERENCE TO RELATED APPLICATION

This application is based on and hereby claims the benefit under 35 U.S.C. § 119 from German Patent Application No. DE 102015216145.5, filed on Aug. 24, 2015, in the German Patent Office. This application is a continuation-in-part of German Patent Application No. DE 102015216145.5, the contents of which are incorporated herein by reference.

TECHNICAL FIELD

The invention relates to a visualization system for vehicles.

BACKGROUND

In visualization systems for vehicles and motor vehicles, such as mirror systems or camera systems, different components or elements must be connected with each other. Screwed, snap-fit, adhered, welded or also riveted connections are known in this regard. Screw connections are expensive, assembly-intensive and limit the creative and geometric freedom of the outer shell of the visualization system. Snap-fit connections, such as they are known, e.g., from DE102008046981 B4, are not climate-resistant for plastics, and there is the risk that these connections will involuntarily come loose.

Based on DE102008046981 B4, it is therefore the object of the present invention to provide a visualization system for vehicles in which the individual elements are connected in a cost-efficient, climate-resistant and simple manner.

Other embodiments and advantages are described in the detailed description below. This summary does not purport to define the invention. The invention is defined by the claims.

SUMMARY

The invention relates to a visualization system for vehicles that has several connected elements. In visualization systems for vehicles and motor vehicles, such as mirror systems or camera systems, different components or elements must be connected with each other. Screwed, snap-fit, adhered, welded and also riveted connections are known in this regard. Screw connections are expensive, assembly-intensive, and limit the creative and geometric freedom of the outer shell of the visualization system. Conventional snap-fit connections are not climate-resistant for plastics, and there is the risk that snap-fit connections will involuntarily come loose. A visualization system for vehicles is disclosed in which the individual elements are connected in a cost-efficient, climate-resistant and simple manner. A securing element is used to wedge the elastic shaft of the housing into an engagement aperture of another element so that the connection between the housing and the other element is permanent and stable. The securing element safely prevents the novel snap-fit connection from involuntarily coming loose due to aging processes of the plastic material. Moreover, the securing element makes a snap-fit connection possible that is easily releasable and re-connectible. This facilitates the exchange of elements and components.

In one embodiment, the visualization system for a vehicle includes a mirror glass, three housing elements and a securing element. The first element includes an engagement aperture. The second element includes a first shaft extending in an outward direction away from the housing. The first shaft has a first undercut opposite a rear side. The third element includes a second shaft extending in an inward direction towards the housing. The second shaft has a second undercut opposite a rear side. The securing element extends in an inward direction into the engagement aperture and presses against both rear sides of the first and second shafts causing both the first and second undercuts to press against the edge of the engagement aperture from opposite sides and thereby preventing the first and second shafts from moving either inward or outward with respect to the first element. The mirror glass is disposed on the opposite side of the third element from the first element.

BRIEF DESCRIPTION OF THE DRAWINGS

The accompanying drawings, where like numerals indicate like components, illustrate embodiments of the invention. The separate figures are schematic and not necessarily drawn in corresponding scale to one another.

DETAILED DESCRIPTION

Reference will now be made in detail to some embodiments of the invention, examples of which are illustrated in the accompanying drawings. In the description and claims, terms such as "inward", "outward", "upward", "downward", "upper" and "lower" are used to describe relative directions and orientations between different elements of the visualization system, and it is to be understood that the overall structure being described can actually be oriented in any way in three-dimensional space.

Figure 1:
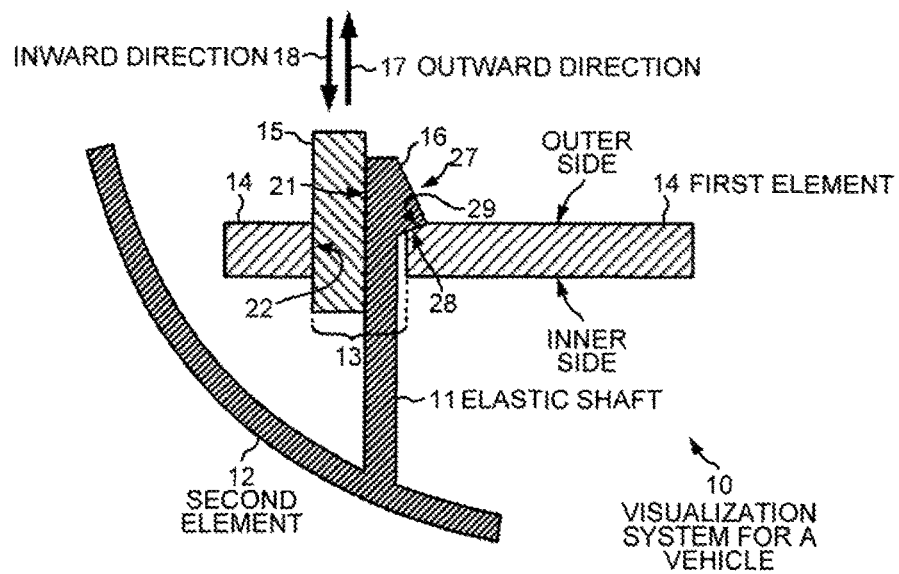
FIG. 1 is a schematic sectional view of a first embodiment of the invention in an assembled state.

FIG. 1 shows a visualization system 10 for a vehicle in which an elastic shaft 11 of a second element 12 snaps into an engagement aperture 13 in a first element 14 so as to connect the two elements 14 and 12 together. The elastic shaft 11 is fixed by a securing element 15 against an edge of the engagement aperture 13 so that the connection between the elastic shaft 11 and the first element 14 is permanent and stable. The securing element 15 safely prevents the snap-fit connection from involuntarily coming loose due to aging processes of the material. Moreover, the securing element 15 makes a snap-fit connection possible that is easily releasable and re-connectable. This facilitates the exchange of elements and components. The plastic elastic shaft 15 allows creative freedom in the design of the visualization system 10. The elements made of plastic are produced in various forms through injection molding.

In one embodiment, three elements are connected with each other such that the elastic shafts of two elements engage in a common engagement aperture 13 of a third element. A single securing element 15 secures the two elastic shafts in the common engagement aperture 13.

The elastic shaft 11 is formed with a simple snap-fit hook 16 that hooks into the engagement aperture 13. Alternatively, the snap-fit hook 16 may also be formed as a double snap-fit hook, which is then secured in the engagement aperture 13 and is prevented from wiggling or shifting.

The outward fitting direction 17 in which the different elements are fitted together runs parallel and opposite to the inward fitting direction 18 in which the securing element 15 is inserted into the engagement aperture 13. Alternatively, a transverse fitting direction 19 in which the different elements are fitted together runs perpendicular to the inward fitting direction 18 of the securing element 15. A fitting direction may also be a rotational, screw or pivoting movement with which the securing element 15 is inserted.

In one embodiment, the securing element 15 is manufactured in one piece together with one of the other elements. The securing element 15 stays connected with the other element via a predetermined breaking point until assembly and is then broken off and used to lock the snap-fit connection. The engagement aperture 13 is through hole into which the elastic shafts 11 and 20 are inserted from opposite sides and then hook onto the other side from which they were inserted. A round through hole is a simple version of an engagement aperture. The securing element 15 supports itself in the locked, assembled state by pressing both against the rear side 21 of the elastic shaft 11 and against the opposite edge 22 of the engagement aperture 13. The elastic shafts 11 and 20 preferably have rectangular cross sections as opposed to a round or oval cross sections, which allows the rear sides 21 and 33 to be flat.

If several elements are connected to each other by elastic shafts that protrude into the common engagement aperture 13, the securing element 15 can support itself by being pressed against the rear sides of the elastic shafts that face towards the inside of the aperture. Thus, the securing element 15 secures the novel snap-fit connection in a simple way.

In the secured, assembled state, the securing element 15 pushes against the rear side 21 of the elastic shaft 11 and braces the elastic shaft in place against the engagement aperture 13. This results in a gap-free snap-fit connection. The securing element 15 is releasably connected with the elastic shaft. Therefore, the snap-fit connection can be released and closed again for replacing elements and components.

The securing element 23 can be held in place in the inward fitting direction 18. Thus, the securing element 23 is prevented from coming loose due to vibrations. The securing element 23 includes an end stop 24 that determines the length at which the securing element 23 is inserted into the engagement aperture 13 to secure the connection of the three elements 14, 12 and 25. The end stop 24 of the securing element 23 is formed with a slanted end 26 as a disassembling aid so that the securing element 15 can be more easily removed to release the connection. Each securing element 15, 23 is preferably designed slightly conically so that a pressing or wedging operation results when the elastic shaft is inserted into the engagement aperture 13 and creates a press fit.

FIG. 1 shows a schematic sectional view of a first embodiment of a visualization system 10 for a vehicle. Visualization system 10 includes a first element 14 that is connected to a second element 12 in the form of a housing. The second element 12 is fitted into the first element 14 in an outward fitting direction 17 directed away from the housing. The housing 12 is made of plastic and is produced by injection molding. The first element 14 may also be made of plastic. An elastic shaft 11 extends away from the remaining portions of housing 12 in the outward fitting direction 17. The elastic shaft 11 includes an engagement side 27 and the rear side 21. The rear side 21 lies opposite the engagement side 27. The engagement side 27 has a snap-fit hook 16 with an undercut.

The first element 14 is disc shaped and includes the engagement aperture 13 in the form of a hole through the element 14. The elastic shaft 11 penetrates the engagement aperture 13 with the snap-fit hook 16 in the outward fitting direction 17 from the inner side and hooks over the opposite outer side of the engagement aperture 13. From the outer side, the cylindrical securing element 15 is inserted into the engagement aperture 13 of the first element 14 in the inward fitting direction 18 so that the securing element 15 supports itself both on the rear side 21 of the elastic shaft 11 and on the opposite edge 22 of the engagement aperture 13. The inward fitting direction 18 is directed inwards towards the housing 12. In this way, the snap-fit hook 16 with the undercut is prevented from releasing its contact with the first element 14, and the snap-fit connection is locked and secured.

The inward fitting direction 18 of the securing element 15 runs parallel to and in the opposite direction of the outward fitting direction 17. The snap-fit hook 16 includes a slanted contact surface 28 of the undercut that contacts the corresponding contact surface 29 of the engagement aperture 13 in the first element 14. Due to the slanted contact surfaces 28 and 29, the elastic shaft 11 is clamped into the engagement aperture 13 and a snap-fit connection results that does not permit wiggling or movement.

Figure 2:
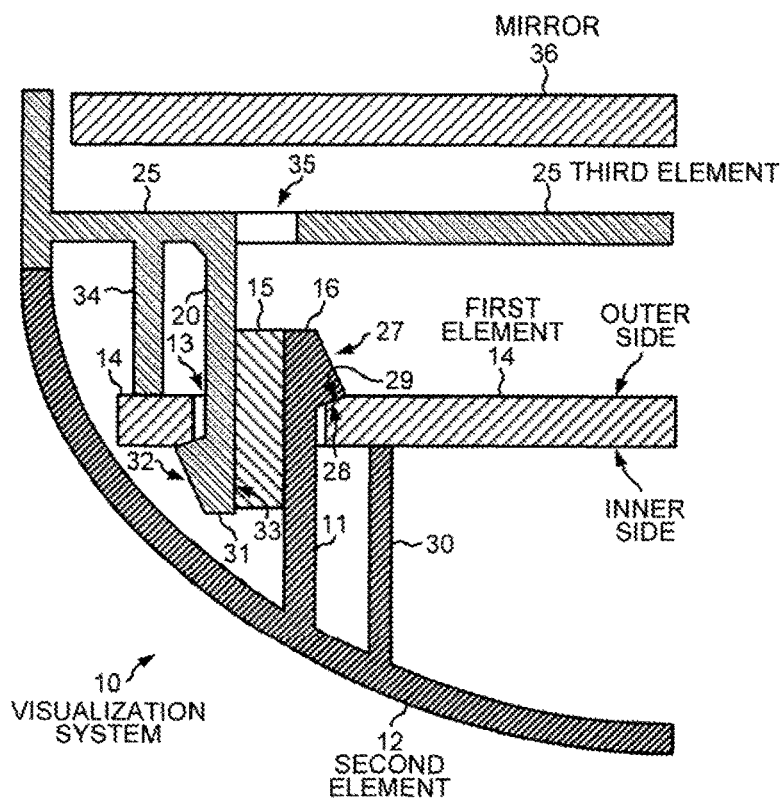
FIG. 2 is a schematic sectional view of a second embodiment of the invention in the assembled state.
Figure 3:
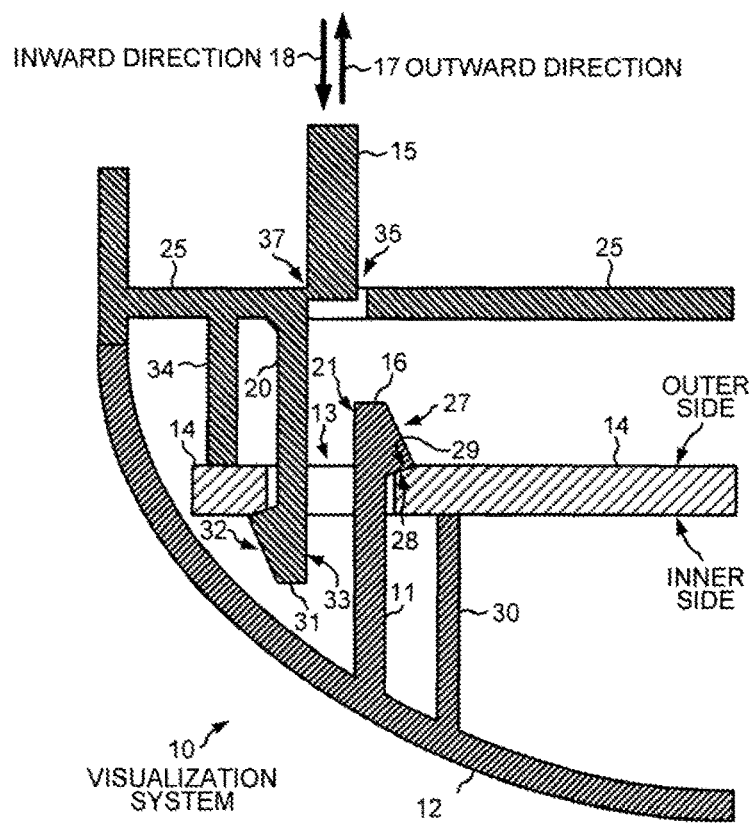
FIG. 3 shows the embodiment of FIG. 2 in an unassembled state.

FIGS. 2-3 show a second embodiment of the invention, in which three elements are connected to each other. The three connected elements are the disc-shaped first element 14, the second element 12 (the housing), and the third element 25. In the second embodiment, the elastic shaft 11 of the housing 12 fits into the engagement aperture 13 of the first element 14 in the same way as in the first embodiment. In the second embodiment, however, a first stop element 30 extends outwards from the shell of the housing 12 parallel to the elastic shaft 11. The first stop element 30 contacts the inner side of the first element 14 in the fitted, assembled state and thus sets an engagement depth of the elastic shaft 11 in the engagement aperture 13.

A second elastic shaft 20 fits into the engagement aperture 13 from the outer side in a mirror-image manner to the first elastic shaft 11. The second elastic shaft 20 corresponds in its structure to the first elastic shaft 11 and also includes a snap-fit hook 31 with an undercut on an engagement side 32 opposite a rear side 33. In a similar manner as with housing 12, a second stop element 34 extends away from the third element 25 parallel to the second elastic shaft 20. In the assembled state, the free end of the second stop element 34 contacts the outer side of the first element 14 closer to the periphery than is the engagement aperture 13. Thus, the second stop element 34 sets the engagement depth of the second elastic shaft 20 in the engagement aperture 13. The two elastic shafts 11 and 20 thus penetrate and fit into the engagement aperture 13 from opposite directions and hook onto the two opposite-facing sides of the first element 14.

The engagement aperture 13 is constructed to be large enough so that a gap remains between the rear side 21 of the first elastic shaft 11 and the rear side 33 of the second elastic shaft 20. In an inserted condition, the securing element 15 is inserted into the gap and presses against the rear sides 21 and 33 of the two elastic shafts 11 and 20. In order to allow the securing element 15 to be inserted between the elastic shafts 11 and 20 in the engagement aperture 13, an insertion aperture 35 is made in the third element 25, which allows the securing element 15 to pass through from the outside. After the three elements 14, 12 and 25 are connected and locked together, a visualization device such as a mirror glass 36 is attached to visualization system 10.

FIG. 3 illustrates how the securing element 15 can be formed as one piece with the third element 25 during production, such as by injection molding. The securing element 15 stays connected to the third element 25 via a predetermined breaking point 37 until visualization system 10 is assembled. During assembly of the three elements 14, 12, and 25, the securing element 15 is broken off from the third element 25 at the predetermined breaking point 37, and the securing element 15 is inserted into the engagement aperture 13 in the inward fitting direction 18 and wedges between the rear side 21 of the first elastic shaft 11 and the rear side 33 of the second elastic shaft 20.

Figure 4:
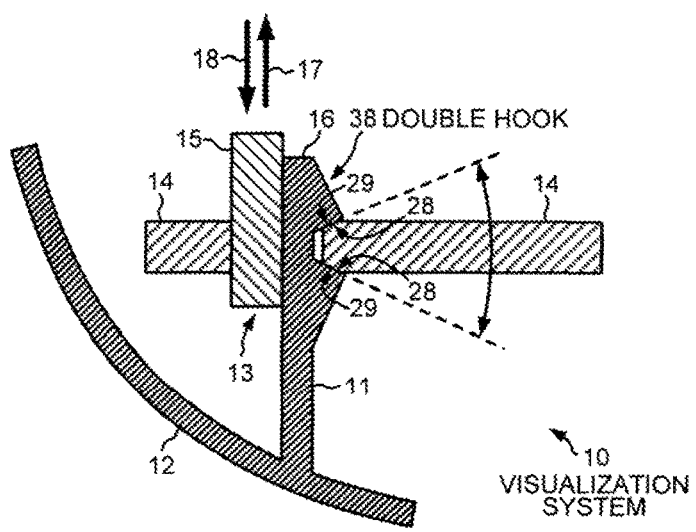
FIG. 4 shows a third embodiment of the invention with an elastic double hook in the assembled state.

FIG. 4 shows a third embodiment that differs from the first embodiment in that the elastic shaft 11 includes a double hook 38. Due to this double hook 38, the elastic shaft 11 is fixed in both the outward and inward directions 17, 18 to the first element 14. The double hook 38 includes two slanted contact surfaces 28 that are angled towards each other. The contact surfaces 28 contact corresponding slanted contact surfaces 29 on the edge of the engagement aperture 13 of the first element 14. The slanted surfaces 28, 29 position the elastic shaft 11 at a defined position and depth relative to the first element 14. The securing element 15 is then inserted in the inward fitting direction 18 into the engagement aperture 13 in the same way as in the embodiment of FIG. 1. The securing element 15 pushes the double hook 38 laterally into the edge of the engagement aperture 13. By inserting the securing element 15, the contact surfaces 29 of the double hook 38 are pressed against the contact surfaces 28 of the engagement aperture 13. This pressed contact not only results in a form-fit, but also in a force-fit between the double hook 38 and the engagement aperture 13.

Figure 5:
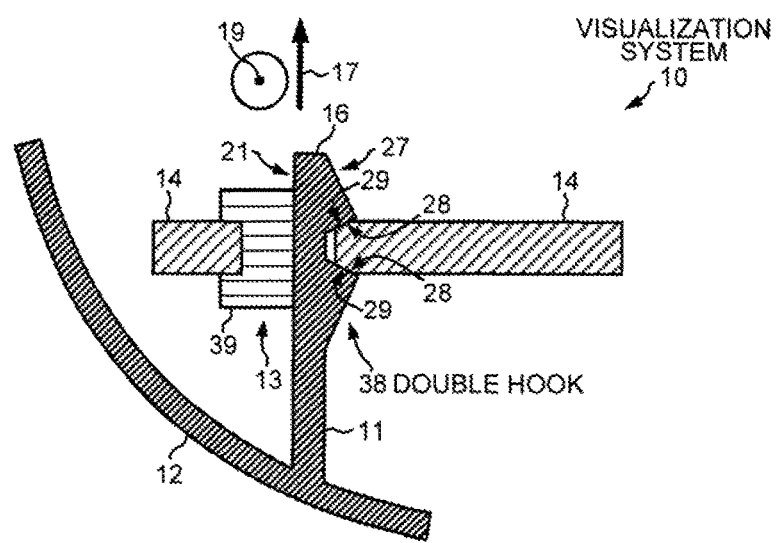
FIG. 5 shows a fourth embodiment of the invention with an elastic double hook in the assembled state.

FIG. 5 shows a fourth embodiment that differs from the embodiment of FIG. 4 in the design of the securing element 39. In the fourth embodiment, the securing element 39 is U-shaped in its cross section. The securing element 39 is inserted into the engagement aperture 13 in a fitting direction 19 that is perpendicular to outward fitting direction 17. Due to the U-shaped cross section, the securing element 39 is prevented from moving in the outward fitting direction 17. The pressed contact of the securing element 39 against the edge of the engagement aperture 13 results not only in a form-fit, but also in a force-fit between the double hook 38 and the engagement aperture 13.

Figure 6:
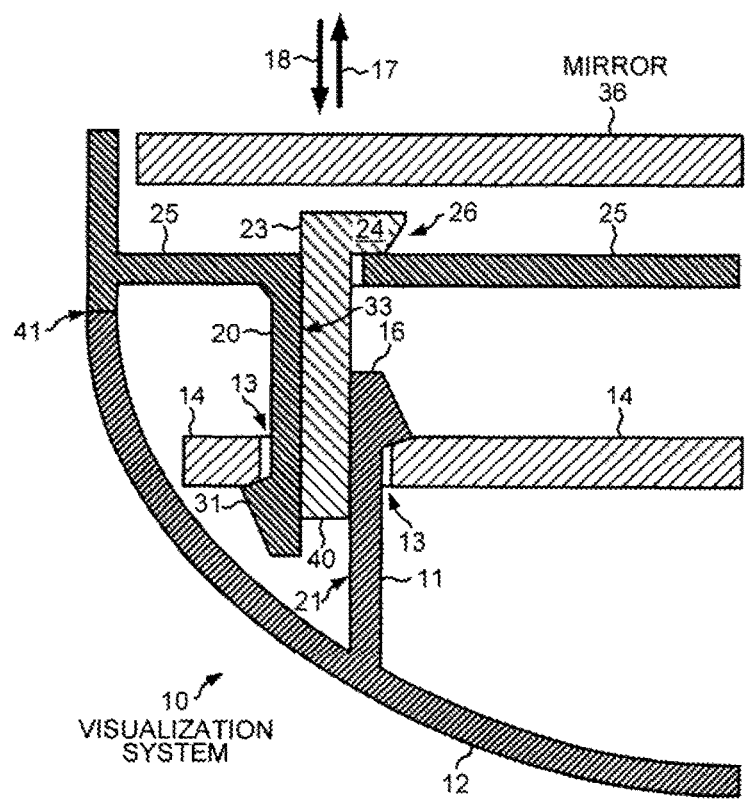
FIG. 6 shows a fifth embodiment of the invention in the assembled state.
Figure 7:
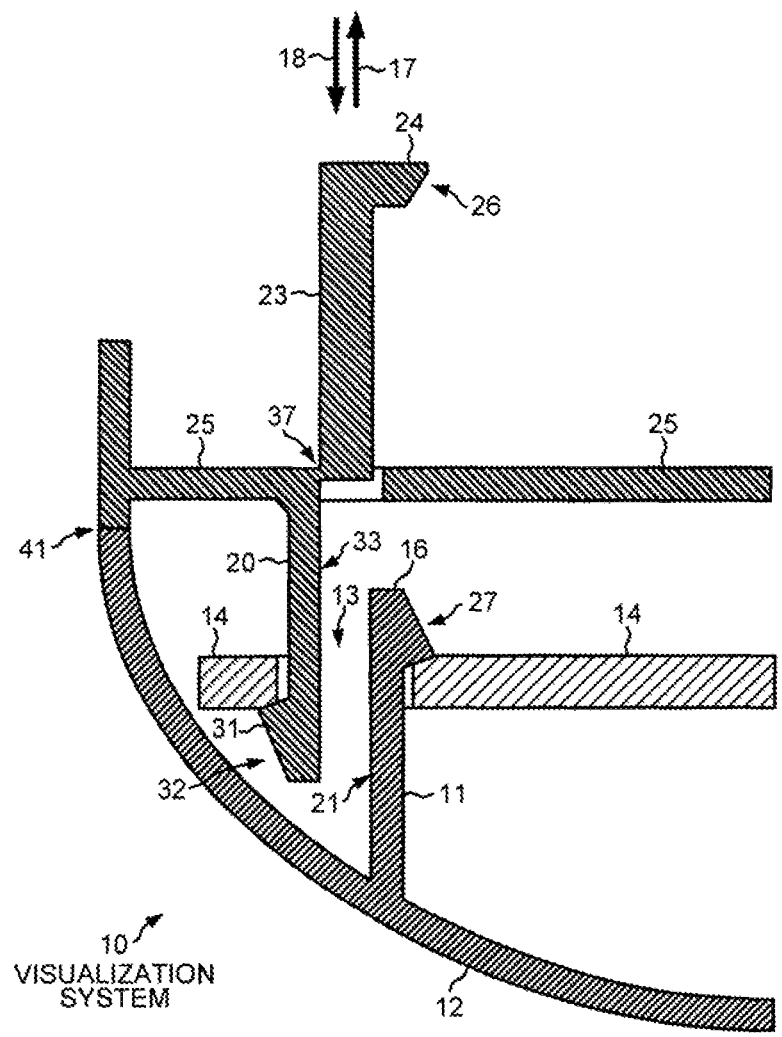
FIG. 7 shows the fifth embodiment of FIG. 6 in the unassembled state.

FIGS. 6-7 show views of a fifth embodiment that correspond to the views of FIGS. 2-3. The embodiment of FIGS. 6-7 differs from the second embodiment of FIGS. 2-3 in the design of the securing element 23 as well as in the omission of the stop elements 30 and 34. At one end, the securing element 23 includes a rectangular stop 24, whose free end 26 is slanted. The stop 24 sets the insertion depth of the securing element 23 into the engagement aperture 13 in the assembled state. The length of the securing element 23 that extends from the stop 24 is chosen such that the end 40 of the securing element 23 opposite the stop 24 extends into the engagement aperture 13. The slanted free end 26 of the stop 24 serves as a disassembling aid for removing the securing element 23 when an element 14, 12, 25 is to be replaced.

FIG. 7 shows the securing element 23 connected to the third element 25 at a predetermined breaking point 37 after production through injection molding and before assembly. During assembly, the securing element 23 is broken off from the third element 25 at the predetermined breaking point 37 and inserted into the engagement aperture 13 so as to wedge between the rear side 21 of the first elastic shaft 11 and the rear side 33 of the second elastic shaft 20.

The securing elements 15, 39, 23 are formed slightly conically so that a wedging operation results during insertion and creates a press fit of the securing element. The stop elements 30 and 34 are not needed in the fifth embodiment because the second element 12 contacts the third element 25 at a stop location 41 that sets the insertion depth of the elastic shafts 11, 20.

In all of the embodiments, the housing 12 and the third element 25 are both made of plastic using injection molding.

LIST OF REFERENCE NUMERALS 10 visualization system
11 first elastic shaft
12 second element, housing
13 engagement aperture
14 first element
15 securing element
16 snap-fit hook of first elastic shaft 11
17 outward fitting direction
18 inward fitting direction
19 inward fitting direction
20 second elastic shaft
21 rear side of first elastic shaft 11
22 opposite edge of aperture 13
23 securing element
24 stop
25 third element
26 slanted free end of stop 24
27 engagement side of first elastic shaft 11
28 slanted contact surface
29 corresponding contact surfaces
30 first stop element
31 snap-fit hook of second elastic shaft 20
32 engagement side of second elastic shaft 20
33 rear side of second elastic shaft 20
34 second stop element
35 insertion aperture for securing element 15
36 visualization device, mirror glass
37 predetermined breaking point
38 double hook of first elastic shaft 11
39 securing element, U-shaped cross section
40 end of securing element 23 opposite stop 24
41 stop location Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A visualization system for vehicles, comprising:
a first element that includes an engagement aperture;
a second element that includes an elastic shaft that extends in an outward fitting direction, wherein the elastic shaft has an engagement side with an undercut and a rear side opposite the engagement side, and wherein the undercut engages an edge of the engagement aperture in an assembled state of the visualization system;
a securing element that presses the elastic shaft against the edge of the engagement aperture in the assembled state; and
a third element that includes a second elastic shaft that extends in an inward fitting direction in the assembled state, wherein the second elastic shaft has an engagement side with an undercut and a rear side opposite the engagement side, wherein the undercut of the second elastic shaft engages the edge of the engagement aperture of the first element, and wherein in the assembled state the securing element presses against both the rear side of the elastic shaft of the second element and the rear side of the second elastic shaft of the third element.

2. The visualization system of claim 1, further comprising:
a mirror glass disposed on an opposite side of the first element from the second element.

3. The visualization system of claim 1, wherein the securing element extends into the engagement aperture and presses against the rear side of the elastic shaft.

4. The visualization system of claim 1, wherein the second element is a housing made of molded plastic.

5. The visualization system of claim 1,
wherein the third element and the securing element are a single piece connected by a breaking point in an unassembled state, and wherein the securing element has been broken off from the third element at the breaking point in the assembled state.

6. The visualization system of claim 1, wherein the securing element presses both the undercut of the elastic shaft of the second element and the undercut of the second elastic shaft of the third element into the edge of the engagement aperture.

7. The visualization system of claim 1, wherein the securing element and the third element are formed together as one piece, and wherein the securing element is separated at a predetermined breaking point from the third element prior to assembling the visualization system.

8. The visualization system of claim 1, wherein the elastic shaft has a snap-fit hook, and wherein the undercut of the elastic shaft is located on the snap-fit hook.

9. The visualization system of claim 1, wherein the elastic shaft has a first slanted contact surface of the undercut and a second slanted contact surface, and wherein the first slanted contact surface and the second slanted contact surface are angled towards each other.

10. The visualization system of claim 9, wherein the securing element presses both the first slanted contact surface and the second slanted contact surface into the edge of the engagement aperture and prevents the elastic shaft from moving in either the outward fitting direction or in an opposite inward fitting direction.

11. The visualization system of claim 1, wherein the securing element extends in the inward fitting direction into the engagement aperture.

12. The visualization system of claim 1, wherein the securing element is releasably connected to the elastic shaft in the assembled state.

13. The visualization system of claim 1, wherein the securing element includes an end stop that determines how far the securing element extends into the engagement aperture.

14. The visualization system of claim 13, wherein the end stop can be used to remove the securing element from the engagement aperture.

15. A visualization system for vehicles, comprising:
a first element that includes an engagement aperture;
a second element that includes a first shaft extending in an outward direction, wherein the first shaft has a first undercut on an engagement side and a rear side opposite the engagement side, and wherein the first undercut presses against an edge of the engagement aperture;
a third element that includes a second shaft extending in an inward direction, wherein the second shaft has a second undercut on an engagement side and a rear side opposite the engagement side, and wherein the second undercut presses against the edge of the engagement aperture;
a securing element that extends in an inward direction into the engagement aperture and presses against both the rear side of the first shaft and the rear side of the second shaft; and
a mirror glass disposed on an opposite side of the third element from the first element.

16. The visualization system of claim 15, wherein the second element is a housing made of molded plastic.

17. The visualization system of claim 15, wherein the securing element and the third element are formed together as one piece, and wherein the securing element is separated at a predetermined breaking point from the third element prior to being extended into the engagement aperture.

18. The visualization system of claim 15, wherein the first shaft has a first slanted contact surface of the first undercut and a second slanted contact surface, and wherein the first slanted contact surface and the second slanted contact surface are angled towards each other.

19. The visualization system of claim 18, wherein the securing element presses both the first slanted contact surface and the second slanted contact surface into the edge of the engagement aperture and prevents the first shaft from moving in either the outward direction or in an opposite inward direction.

20. The visualization system of claim 18, wherein the securing element includes an end stop that can be used to remove the securing element from the engagement aperture.

* * * * *